United States Patent [19]

Ronk et al.

[11] 4,249,237
[45] Feb. 3, 1981

[54] ROTARY PHASE CONVERTER

[75] Inventors: Leroy B. Ronk; Claude M. Hertz, both of Nokomis, Ill.

[73] Assignee: Ronk Electrical Industries, Inc., Nokomis, Ill.

[21] Appl. No.: 28,263

[22] Filed: Apr. 9, 1979

[51] Int. Cl.[3] .............................................. H02M 5/32
[52] U.S. Cl. .................................................... 363/150
[58] Field of Search ............... 363/150, 153, 154, 155, 363/156

[56] References Cited

U.S. PATENT DOCUMENTS

| | | | |
|---|---|---|---|
| 1,246,617 | 11/1917 | Lamme | 363/150 |
| 1,365,691 | 1/1921 | Hellmund | 363/150 |
| 3,202,896 | 8/1965 | Lewus | 363/153 X |
| 3,670,238 | 6/1972 | Ronk | 363/150 |
| 3,809,980 | 5/1974 | Nottingham, Jr. | 318/220 R |
| 4,079,446 | 3/1978 | Hertz | 363/150 |
| 4,158,225 | 6/1979 | Hertz | 363/150 |

*Primary Examiner*—William M. Shoop
*Attorney, Agent, or Firm*—Senniger, Powers, Leavitt and Roedel

[57] ABSTRACT

A rotary phase converter for connection to a single-phase a.c. power source and adapted to supply polyphase current to a polyphase electrical load. The converter includes a dynamoelectric machine having at least three stator windings and at least first, second and third output terminals, an autotransformer and at least one capacitor. The stator windings of the dynamoelectric machine are oriented symmetrically with respect to each other both physically and electrically and each has a substantially equal number of active turns. The first and second terminals of the dynamoelectric machine are adapted to be connected to the single-phase a.c. power source and they are also outputs of the converter. The autotransformer is connected across the second and third terminals and has at least one tap positioned intermediate the ends thereof to serve as an output of the converter. The capacitor is connected between the first output terminal and the autotransformer tap serving as a converter output. The currents supplied from the converter outputs to the phases of the polyphase load are maintained substantially balanced at full load.

6 Claims, 3 Drawing Figures

ROTARY PHASE CONVERTER

BACKGROUND OF THE INVENTION

This invention relates to apparatus for converting single-phase a.c. power to polyphase a.c. power and more particularly to such apparatus which includes a rotary dynamoelectric machine.

Rotary phase converters are used to convert single-phase a.c. power to three-phase power. They are particularly useful in farm and some industrial settings where three-phase electrical machinery is needed but where three-phase utility power is unavailable. In use, such converters may supply three-phase power to one or many electrical machines, such as motors. Ideally, a rotary converter is capable of supplying this power indefinitely as long as the electrical load does not exceed the rated capacity of the converter.

A major problem with rotary converters is that as load conditions vary, electrical imbalances are created which result in unbalanced phase currents in the three-phase load. Depending upon the degree of this unbalance, excessive currents may exist in one or more of the load's phases. If the load is, for example, a three-phase motor, a current may be supplied to one of the motor windings which exceeds the maximum rated current carrying capacity for the winding. This causes overheating, particularly of the winding insulation. As a consequence, useful life of the motor or other electrical machine is reduced, necessitating more frequent machine replacement and increased expense to the owner or operator of a facility in which the machine is used.

There are several approaches to solving this problem but all are relatively expensive or otherwise capable of being improved. One approach is to derate the rotary converter so that it supplies power to only a fraction of its rated load capacity. This is unsatisfactory, however, since additional rotary converters are required to service the three-phase equipment and the capital investment for the facility is increased. Another approach is to add additional capacitance to the system, preferably on the load side of the converter. While this approach may improve the current balance somewhat, it is far from an adequate and economical solution to the problem since such additional capacitance increases both the cost and size of the converter. A third approach is shown in U.S. Pat. No. 4,079,446 and involves internally tapping the stator windings of the converter. This approach is a substantial improvement over the other two, but it too could be improved.

SUMMARY OF THE INVENTION

Among the several objects of the invention may be noted the provision of a rotary phase converter which supplies polyphase current to a polyphase electrical load; the provision of such a rotary converter for supplying substantially balanced currents to each phase of the load; the provision of such a rotary converter for supplying to each phase of the load a current which does not exceed the maximum rated current-carrying capacity for that phase; the provision of such a rotary phase converter which has increased efficiency and load-carrying capacity while minimizing the use of additional capacitance for balancing the currents in the phases of the loads being supplied; the provision of such a rotary converter which does not require any internal tapping of stator windings; and the provision of such a rotary converter which is of relatively simple, inexpensive and easily manufactured construction.

Briefly, a rotary converter of the invention for connection to a single-phase a.c. power source and adapted to supply polyphase current to a polyphase electrical load comprises a dynamoelectric machine having at least three stator windings and at least first, second and third output terminals, an autotransformer, and at least one capacitor. The stator windings are oriented symmetrically with respect to each other both physically and electrically, each winding having a substantially equal number of active turns. The first and second terminals are adapted to be connected to the single-phase a.c. power source and are outputs of the converter. The autotransformer is connected across the second and third terminals and has at least one tap positioned intermediate the ends thereof to serve as a third output of the converter. The capacitor is connected between the first terminal and the autotransformer tap serving as a converter output, whereby the currents supplied from the converter outputs to the phases of the polyphase load are maintained substantially balanced at full load. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
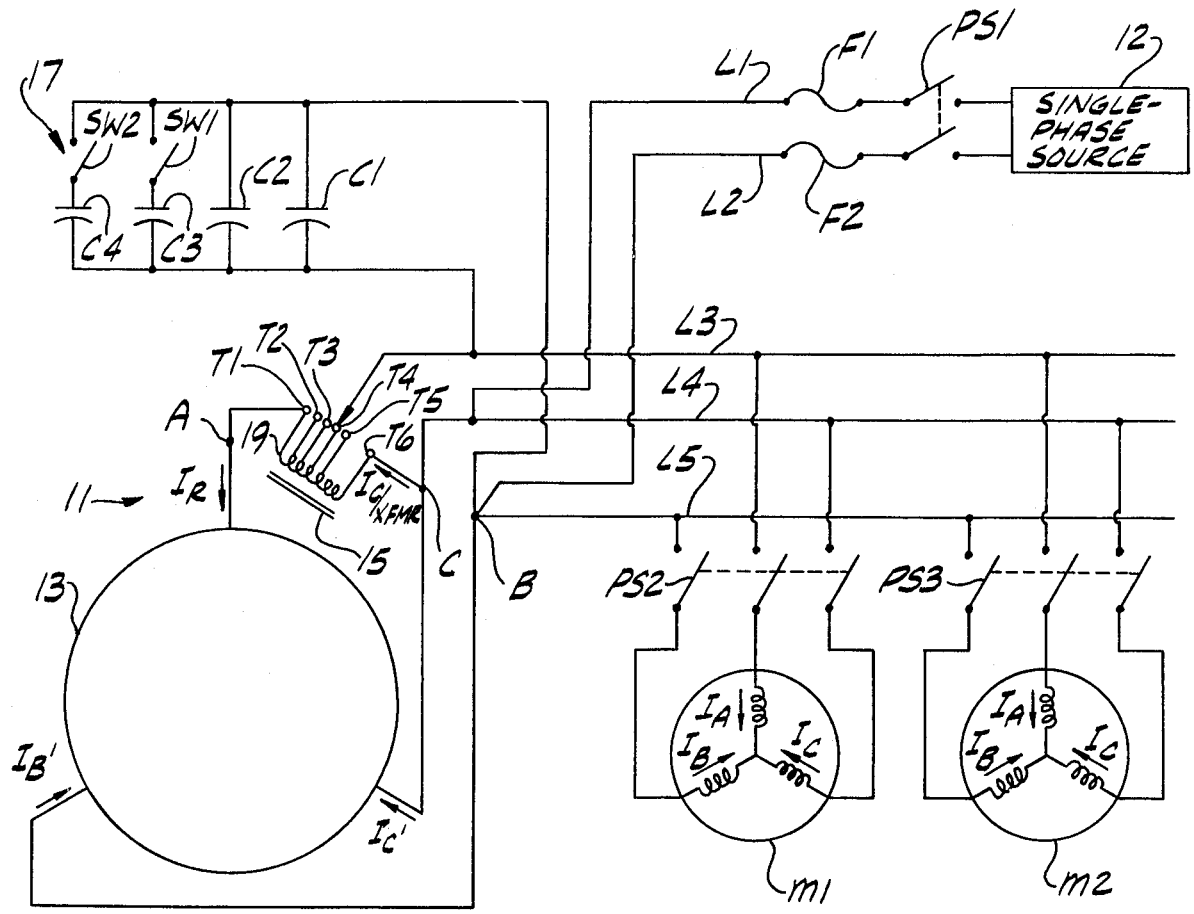
FIG. 1 is a schematic circuit diagram of a system using a rotary converter of the present invention for operation of three-phase loads from a single-phase a.c. power source.

Referring now to the drawings, a rotary phase converter of the present invention is shown generally at 11. Converter 11 is connected by means of two power leads L1 and L2 to an a.c. power source 12 which supplies, e.g., 230 V at 60 Hz thereto. Leads L1 and L2 include a ganged power switch PS1 and two fuses F1 and F2. During operation, polyphase current, specifically three-phase current, is supplied from converter 11 via three power leads L3, L4 and L5 to a polyphase load, shown as consisting of two three-phase motors M1 and M2.

Converter 11 includes a dynamoelectric electric machine 13, e.g., a standard 30 hp, three-phase electric motor with its shaft cut off, having three output terminals A, B and C; an autotransformer 15 connected across terminals A and C; and a capacitor bank 17 consisting of four capacitors C1, C2, C3 and C4 and two switches SW1 and SW2. Autotransformer 15 includes a winding 19 having six taps T1–T6 and, e.g., 180 turns. Tap T1 is disposed at one end of winding 19 and is connected to terminal A, and tap T6 is disposed at the other end of the winding and is connected to terminal C. Taps T2, T3, T4 and T5 are positioned intermediate taps T1 and T6, but nearer tap T1. Any of taps T1–T5 can be used as an output of the converter as required by the particular load conditions on the system, the other two outputs being terminals B and C. Eighty-five percent (85%) of the active turns of winding 19 are between taps T5 and T6, 90% are between taps T4 and T6, approximately 94% are between taps T3 and T6, and approximately 97% are between taps T2 and T6. Simply by changing taps, therefore, the user of converter 11 easily changes the converter output to suit various load conditions. Capacitor bank 17 is connected between terminal B and one of taps T1–T5, as is explained in more detail below.

The winding of transformer 15 consists of two sections, the first running from terminal T6 to terminal T5 and the second running from terminals T5 to terminal T1. Most of the current in autotransformer 11 flows through the second section and so it is made of a heavier gage wire, i.e., it has a greater cross sectional area than the first section. For example #10 magnet wire is used to wind the first section, while #4 magnet wire is used to wind the second. For purposes of illustration the length of the second section of winding 19 relative to the length of the first section has been exaggerated.

Figure 2:
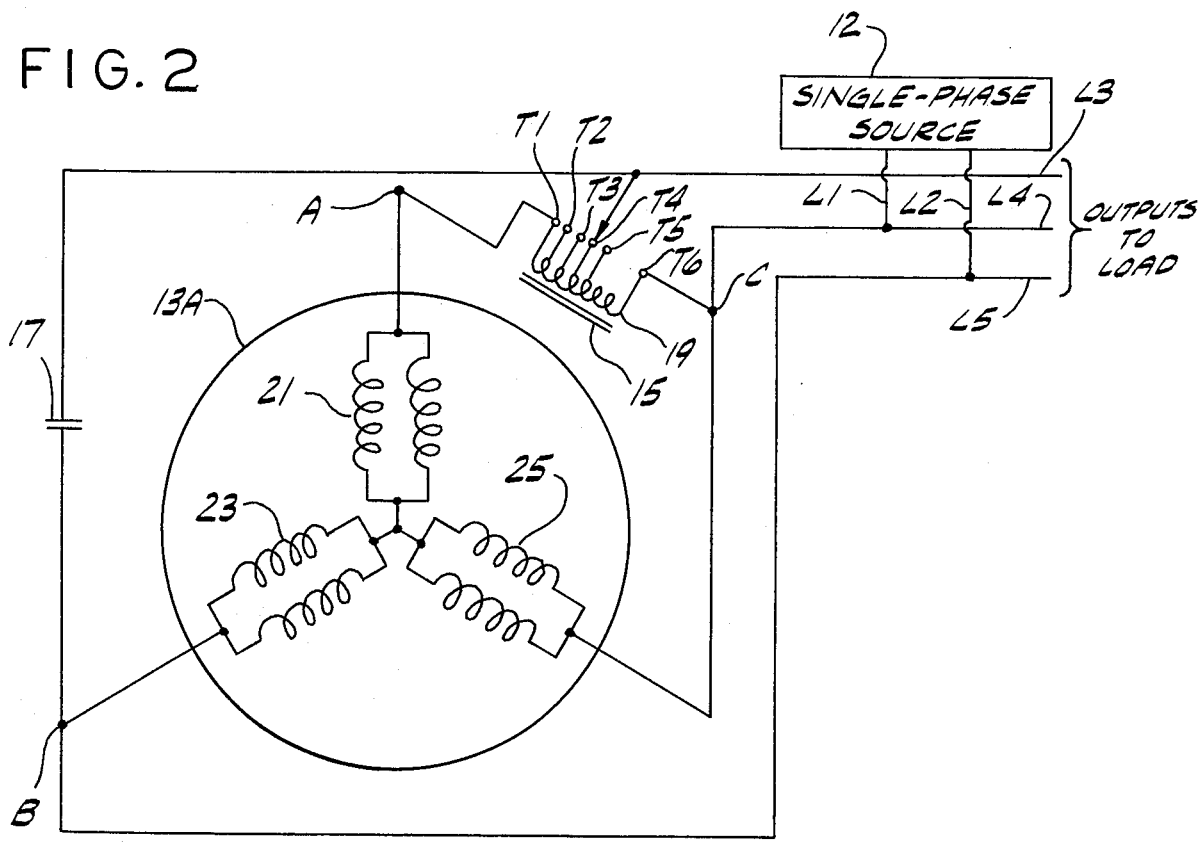
FIG. 2 is a schematic diagram of a rotary converter of this invention whose stator windings are connected in a wye configuration.
Figure 3:
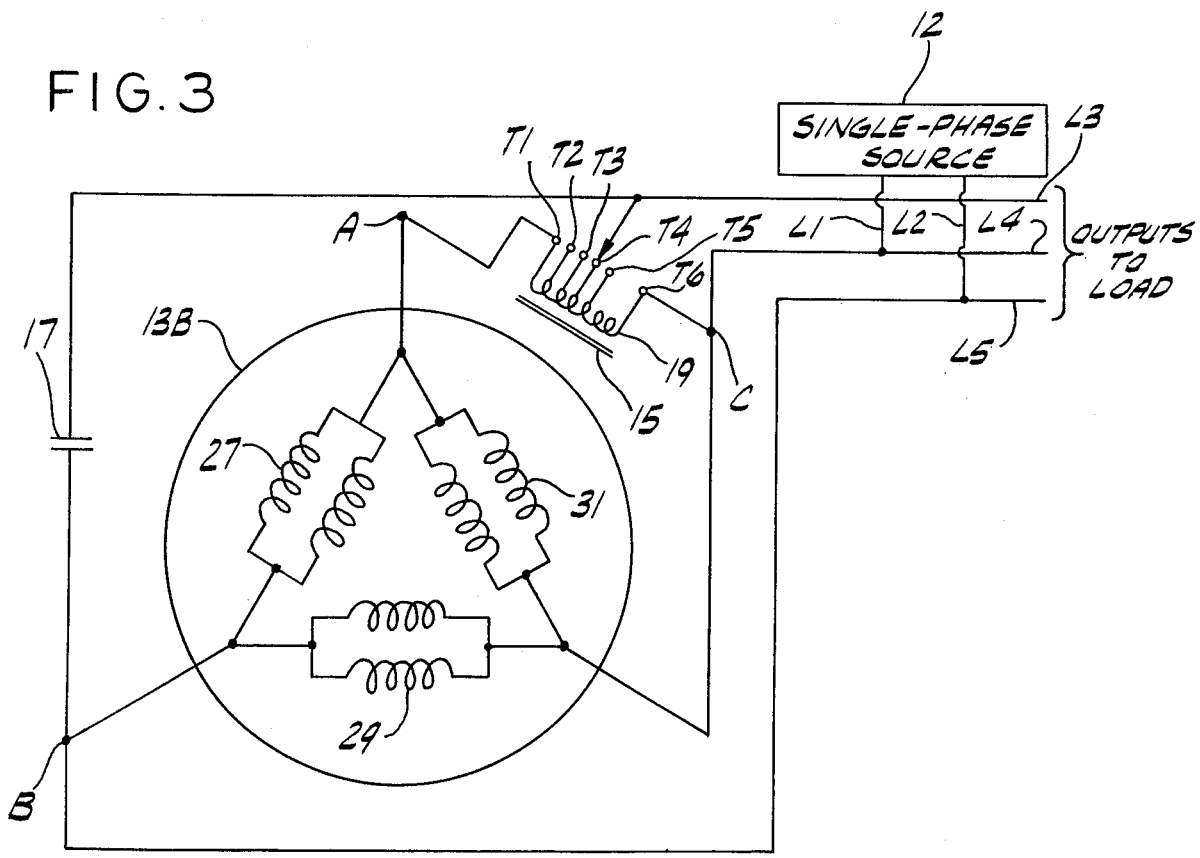
FIG. 3 is a schematic diagram of a rotary converter of this invention whose stator windings are connected in a delta configuration.

A simplified representation of converter 11 is shown in FIGS. 2 and 3. In FIG. 2 the dynamoelectric machine is shown as a wye-connected electric motor 13A having first, second and third dual stator windings 21, 23 and 25 connected to terminals A, B and C, respectively. In FIG. 2 autotransformer 15 is connected across two windings, viz, windings 21 and 25. FIG. 3 is similar to FIG. 2, except that the dynamoelectric machine is shown as a delta-connected motor 13B having three phase windings 27, 29 and 31. In this embodiment of the invention, autotransformer 15 is connected directly across only winding 31. In both FIGS. 2 and 3, capacitor bank 17 is represented by a single capacitor. In both embodiments the dynamoelectric machine has at least three stator windings (21, 23 and 25 or 27, 29 and 31) which are oriented symmetrically with respect to each other both physically and electrically in the conventional fashion, each winding having a substantially equal number of active turns.

In operation, ganged power switch PS1 (see FIG. 1) is closed so that power from the single-phase a.c. source is supplied to the converter, specifically to terminals B and C of dynamoelectric machine 13. Capacitor bank 17 creates a capacitive reactance that provides the phase shift necessary for the converter to supply three-phase power on leads L3, L4 and L5 to the polyphase load. However, the presence of this capacitive reactance creates an impedance imbalance in the converter phases, as is known in the art.

Once dynamoelectric machine 13 comes up to speed, motors M1 and M2 are connected to leads L3, L4 and L5 as desired by means of two ganged power switches PS2 and PS3 and phase currents $I_A$, $I_B$ and $I_C$ start flowing in motors M1 and M2 as shown in FIG. 1. The relative magnitudes of these currents in each motor are a function of the total amount of capacitance, which in the present case is supplied by capacitor bank 17, and of the particular tap T1–T5 which is connected to lead L3. That is, the relative magnitudes of the phase currents in the polyphase load are responsive to the particular tap being used as a converter output and to the amount of capacitance in bank 17. The first is changed by simply connecting lead L3 to the desired tap and the second is changed by, i.e., opening or closing switches SW1 and SW2 as desired. When the electrical load on motors M1 and M2 is small, currents $I_A$, $I_B$ and $I_C$ are relatively balanced even without the present invention. As these loads increase, however, significant unbalance can occur in the absence of this invention, and in some cases the maximum current-carrying capacity of a particular motor winding may be exceeded. The degree of current imbalance in either motor is easily determined by measuring the currents $I_A$, $I_B$ and $I_C$ flowing in that motor and using the following formula, which is known in the art:

$$\text{Percent unbalance} = 100 \times (I_{max} - I_{ave})/(I_{ave})$$

where $I_{ave}$ equals the average current in the phases, and $I_{max}$ equals the phase current which has the maximum deviation from the average current.

A series of tests showing the effect on phase current imbalance in the motors of changes in tap and capacitance have been run and the results are summarized in the accompanying tables. In these tests motor M1 had a nominal rating of 25 hp and motor M2 had a nominal rating of 20 hp. Each table contains all the data for a particular tap and in particular displays $I_A$, $I_B$ and $I_C$ for each motor along with the percent unbalance for each of a number of capacitances. Also displayed are two currents $I_X$ and $I_{C/XFMR}$ which flow through the autotransformer (see FIG. 1), a current $I_R$ which flows through terminal A of machine 13, and currents $I_{B'}$ and $I_{C'}$ which flow through terminals B and C respectively, as well as the percent unbalance for currents $I_R$, $I_{B'}$ and $I_{C'}$. These tests reveal that by a judicious selection of capacitance in bank 17 and of autotransformer tap, the phase currents can be substantially balanced for any of a wide range of loads.

Table I shows the results of these tests when lead L3 is connected to tap T1. In this configuration, the autotransformer has little or no effect on the output of converter 11. Therefore, the output of converter 11 when lead L3 is connected directly to tap T1, and hence directly to terminal A, is substantially that of conventional rotary converters and can be used as the base against which the effects of the present invention are measured.

TABLE I

| Lead L3 Connected to Tap T1 | | | | | | | | | | | | | | | |
|---|---|---|---|---|---|---|---|---|---|---|---|---|---|---|---|
| Converter | | | | | | Motor 1 | | | | | Motor 2 | | | | |
| $I_R$ | $I_{B'}$ | $I_{C'}$ | % Unbalance | $I_X$ | $I_{C/XFMR}$ | $I_A$ | $I_B$ | $I_C$ | % Unbalance | HP | $I_A$ | $I_B$ | $I_C$ | % Unbalance | HP | CAPACITANCE |
| 80 | 72 | 14 | 44.6 | 80 | — | — | — | — | — | — | — | — | — | — | — | 800 mF |
| 38 | 49 | 28 | 27.8 | 38 | — | 39 | 49 | 26 | 28.9 | idle | — | — | — | — | — | |
| 33 | 39 | 30 | 14.7 | 33 | — | 42 | 48 | 35 | 15.2 | 10 | — | — | — | — | — | |
| 28 | 31 | 36 | 13.7 | 28 | — | 47 | 60 | 59 | 8.4 | 20 | — | — | — | — | — | |
| 25 | 48 | 40 | 27.4 | 25 | — | 50 | 77 | 80 | 15.9 | 25 | — | — | — | — | — | |
| 35 | 29 | 37 | 9.9 | 35 | — | 64 | 64 | 75 | 10.8 | 25 | — | — | — | — | — | 1140 mF |
| 52 | 36 | 36 | 25.8 | 52 | — | 81 | 55 | 71 | 17.4 | 25 | — | — | — | — | — | 1500 mF |
| 36 | 28 | 37 | 9.9 | 36 | — | 65 | 62 | 75 | 11.4 | 25 | 27 | 23 | 32 | 17.1 | 10 | |
| 34 | 37 | 44 | 14.8 | 34 | — | 55 | 67 | 81 | 19.7 | 25 | 41 | 50 | 61 | 20.4 | 20 | |
| 40 | 28 | 42 | 14.5 | 40 | — | 64 | 61 | 79 | 16.2 | 25 | 44 | 43 | 57 | 18.8 | 20 | 2060 mF |

TABLE I-continued

| | | | | | | | | | | | | | | | | |
|---|---|---|---|---|---|---|---|---|---|---|---|---|---|---|---|---|
| Lead L3 Connected to Tap T1 | | | | | | | | | | | | | | | | |
| Converter | | | | | | Motor 1 | | | | | Motor 2 | | | | | |
| $I_R$ | $I_{B'}$ | $I_C$ | % Un-balance | $I_X$ | $I_{X/XFMR}$ | $I_A$ | $I_B$ | $I_C$ | % Un-balance | HP | $I_A$ | $I_B$ | $I_C$ | % Un-balance | HP | CAPACITANCE |
| 55 | 33 | 43 | 26.0 | 55 | — | 79 | 52 | 78 | 13.4 | 25 | 53 | 35 | 54 | 14.1 | 20 | 2500 mF |
| 51 | 28 | 44 | 24.4 | 51 | — | 74 | 52 | 80 | 16.5 | 25 | 59 | 46 | 67 | 16.9 | 25 | |

From Table I one can readily see that for a conventional rotary converter, unbalance in the windings of motor M1, and motor M2 when used, exceeds 10% for practically all load conditions. In fact, under full load conditions (25 hp on motor M1 and 20 hp on motor M2) the best unbalance figures are 13.4% for motor M1 and 14.1% for motor M2.

Table II contains the results obtained when lead L3 was connected to tap T2, i.e., to the 97% point of autotransformer 15.

Under full load for motor M1 alone the unbalance in its windings was only 1.0% with a capacitance of 1400 mF. Contrast this to the 8.4% figures in Table I for the best balance in the windings of motor M1 when it is run alone. And this latter figure was not achieved at full load. A similar significant difference in operation, as compared to that shown in Table I, occurs when motors M1 and M2 are both on line and at full load. At 1900 mF, the unbalance in the windings of motor M1 is only 4.0%, as compared to 13.4% for the corresponding best

TABLE II

| | | | | | | | | | | | | | | | | |
|---|---|---|---|---|---|---|---|---|---|---|---|---|---|---|---|---|
| Lead L3 Connected to Tap T2 | | | | | | | | | | | | | | | | |
| Converter | | | | | | Motor 1 | | | | | Motor 2 | | | | | |
| $I_R$ | $I_{B'}$ | $I_C$ | % Un-balance | $I_X$ | $I_{X/XFMR}$ | $I_A$ | $I_B$ | $I_C$ | % Un-balance | HP | $I_A$ | $I_B$ | $I_C$ | % Un-balance | HP | CAPACITANCE |
| 75 | 74 | 12 | 39.8 | 80 | 4 | — | — | — | — | — | — | — | — | — | — | 800 mF |
| 38 | 51 | 28 | 30.8 | 42 | 2 | 34 | 54 | 30 | 37.3 | idle | — | — | — | — | — | |
| 34 | 40 | 31 | 14.3 | 37 | 2 | 39 | 53 | 36 | 24.2 | 10 | — | — | — | — | — | |
| 30 | 32 | 37 | 12.1 | 33 | 2 | 46 | 67 | 60 | 16.2 | 20 | — | — | — | — | — | |
| 26 | 28 | 41 | 29.5 | 29 | 1.6 | 51 | 84 | 82 | 16.1 | 25 | — | — | — | — | — | |
| 42 | 32 | 37 | 13.5 | 46 | 2.6 | 68 | 67 | 70 | 2.4 | 25 | — | — | — | — | — | 1260 mF |
| 55 | 39 | 36 | 26.9 | 59 | 3.4 | 78 | 61 | 68 | 13.0 | 25 | — | — | — | — | — | 1500 mF |
| 40 | 29 | 48 | 23.1 | 44 | 2.6 | 64 | 66 | 73 | 7.9 | 25 | 25 | 25 | 30 | 12.5 | 10 | |
| 34 | 22 | 42 | 28.6 | 38 | 2.1 | 53 | 71 | 82 | 19.4 | 25 | 40 | 53 | 61 | 18.8 | 20 | |
| 43 | 24 | 42 | 18.3 | 46 | 2.9 | 63 | 63 | 79 | 15.6 | 25 | 45 | 46 | 59 | 18.0 | 20 | 1700 mF |
| 55 | 29 | 42 | 31.0 | 59 | 3.3 | 73 | 56 | 78 | 13.0 | 25 | 51 | 39 | 56 | 15.1 | 20 | 2000 mF |

Again for most load conditions the unbalance in the windings of motors M1 and M2 exceeds 10% but when motor M1 is being driven alone at full load with the capacitance of bank 17 being 1260 mF, the unbalance decreases to 2.4%.

Even better performance is achieved with these particular motors M1 and M2 when lead L3 is connected to tap T3 of the autotransformer. This data is shown in Table III.

unbalance figure for a conventional rotary converter, as shown in Table I. This balance of currents in motor M1 is not achieved at the expense of the current balance in motor M2. The unbalance figure for motor M2 under these conditions is 14.3%, which compares well with the corresponding figure of 14.1% shown in Table I.

Table IV shows the results of the tests made with lead L3 connected to tap T4.

TABLE III

| | | | | | | | | | | | | | | | | |
|---|---|---|---|---|---|---|---|---|---|---|---|---|---|---|---|---|
| Lead L3 Connected to Tap T3 | | | | | | | | | | | | | | | | |
| Converter | | | | | | Motor 1 | | | | | Motor 2 | | | | | |
| $I_R$ | $I_{B'}$ | $I_C$ | % Un-balance | $I_X$ | $I_{X/XFMR}$ | $I_A$ | $I_B$ | $I_C$ | % Un-balance | HP | $I_A$ | $I_B$ | $I_C$ | % Un-balance | HP | CAPACITANCE |
| 65 | 50 | 32 | 32.7 | 71 | 6 | 71 | 60 | 48 | 19.0 | 20 | — | — | — | — | — | 1500 mF |
| 52 | 42 | 34 | 21.9 | 57 | 5 | 61 | 61 | 50 | 6.4 | 20 | — | — | — | — | — | 1300 mF |
| 58 | 40 | 37 | 28.9 | 64 | 5.5 | 76 | 66 | 68 | 8.6 | 25 | — | — | — | — | — | 1500 mF |
| 50 | 36 | 37 | 22.0 | 56 | 5 | 70 | 69 | 69 | 1.0 | 25 | — | — | — | — | — | 1400 mF |
| 43 | 28 | 39 | 17.3 | 47 | 4 | 63 | 72 | 75 | 7.1 | 25 | 22 | 27 | 30 | 13.9 | 10 | 1500 mF |
| 38 | 21 | 43 | 26.5 | 43 | 3.7 | 55 | 76 | 84 | 17.2 | 25 | 39 | 54 | 61 | 18.8 | 20 | |
| 53 | 27 | 42 | 30.3 | 58 | 5 | 67 | 65 | 70 | 4.0 | 25 | 46 | 45 | 56 | 14.3 | 20 | 1900 mF |
| 74 | 38 | 44 | 42.3 | 80 | 6.6 | 82 | 57 | 77 | 13.9 | 25 | 55 | 37 | 52 | 14.6 | 20 | 2300 mF |

TABLE IV

| | | | | | | | | | | | | | | | | |
|---|---|---|---|---|---|---|---|---|---|---|---|---|---|---|---|---|
| Lead L3 Connected to Tap T4 | | | | | | | | | | | | | | | | |
| Converter | | | | | | Motor 1 | | | | | Motor 2 | | | | | |
| $I_R$ | $I_{B'}$ | $I_C$ | % Un-balance | $I_X$ | $I_{X/XFMR}$ | $I_A$ | $I_B$ | $I_C$ | % Un-balance | HP | $I_A$ | $I_B$ | $I_C$ | % Un-balance | HP | CAPACITANCE |
| 62 | 42 | 37 | 31.9 | 71 | 8.6 | 72 | 73 | 62 | 5.8 | 25 | — | — | — | — | — | 1500 mF |
| 52 | 36 | 38 | 23.8 | 59 | 7 | 65 | 76 | 65 | 10.7 | 25 | — | — | — | — | — | 1340 mF |
| 52 | 32 | 40 | 25.8 | 60 | 7.2 | 63 | 74 | 70 | 7.2 | 25 | 22 | 29 | 27 | 11.5 | 10 | 1500 mF |
| 61 | 36 | 39 | 34.6 | 69 | 8.2 | 69 | 70 | 67 | 1.9 | 25 | 26 | 27 | 25 | 3.8 | 10 | 1720 mF |

TABLE IV-continued

| | Converter | | | | | Motor 1 | | | Lead L3 Connected to Tap T4 | | Motor 2 | | | | |
|---|---|---|---|---|---|---|---|---|---|---|---|---|---|---|---|
| $I_R$ | $I_{B'}$ | $I_C$ | % Unbalance | $I_X$ | $I_{X/XFMR}$ | $I_A$ | $I_B$ | $I_C$ | % Unbalance | HP | $I_A$ | $I_B$ | $I_C$ | % Unbalance | HP | CAPACITANCE |
| 65 | 31 | 43 | 40.3 | 74 | 8.8 | 67 | 63 | 73 | 7.9 | 25 | 49 | 47 | 53 | 6.7 | 10 | 2000 mF |

The results indicate a continuing improvement in the balance of currents in motors M1 and M2 as compared to that shown in Tables I–III. Specifically, with a load of 25 hp on motor M1 and a load of 10 hp on motor M2 the unbalance in the motor windings was 1.9% and 3.8% respectively when the capacitance of bank 17 was 1720 mF.

The final tests were performed with lead L3 connected to tap T5. The results of those tests are set forth in Table V.

TABLE V

| | Converter | | | | | Motor 1 | | | Lead L3 Connected to Tap T5 | | Motor 2 | | | | |
|---|---|---|---|---|---|---|---|---|---|---|---|---|---|---|---|
| $I_R$ | $I_{B'}$ | $I_C$ | % Unbalance | $I_X$ | $I_{X/XFMR}$ | $I_A$ | $I_B$ | $I_C$ | % Unbalance | HP | $I_A$ | $I_B$ | $I_C$ | % Unbalance | HP | CAPACITANCE |
| 67 | 76 | 18 | 41.6 | 80 | 13 | — | — | — | — | — | — | — | — | — | — | 800 mF |
| 42 | 32 | 38 | 12.5 | 51 | 8.4 | 44 | 80 | 54 | 34.8 | 20 | — | — | — | — | — | |
| 72 | 53 | 32 | 37.6 | 86 | 15.5 | 63 | 72 | 40 | 23.4 | 20 | — | — | — | — | — | 1500 mF |
| 89 | 65 | 33 | 42.8 | 118 | 19 | 71 | 71 | 37 | 19.0 | 20 | — | — | — | — | — | 1800 mF |
| 95 | 64 | 38 | 44.7 | 125 | 20 | 84 | 78 | 56 | 15.6 | 25 | — | — | — | — | — | 2000 mF |
| 66 | 42 | 38 | 35.6 | 79 | 14 | 70 | 83 | 62 | 15.8 | 25 | — | — | — | — | — | 1500 mF |
| 59 | 32 | 40 | 35.1 | 70 | 12 | 63 | 84 | 70 | 16.1 | 25 | 18 | 32 | 25 | 28.0 | 10 | |
| 80 | 47 | 40 | 43.7 | 96 | 17 | 74 | 76 | 63 | 7.0 | 25 | 26 | 29 | 20 | 16.0 | 10 | 2000 mF |
| 84 | 50 | 41 | 44.0 | 100 | 18 | 77 | 76 | 62 | 7.4 | 25 | 28 | 29 | 19 | 14.5 | 10 | 2120 mF |
| 68 | 31 | 45 | 41.7 | 82 | 15 | 66 | 75 | 74 | 4.7 | 25 | 43 | 52 | 50 | 7.6 | 20 | 2000 mF |
| 81 | 42 | 46 | 43.8 | 96 | 18 | 71 | 72 | 71 | 0.9 | 25 | 48 | 48 | 47 | 0.7 | 20 | 2260 mF |
| 86 | 44 | 48 | 44.9 | 115 | 19 | 73 | 70 | 71 | 2.3 | 25 | 54 | 52 | 52 | 2.5 | 22 | 2400 mF |
| 87 | 42 | 50 | 45.8 | 115 | 19 | 81 | 79 | 82 | 1.7 | 30 | 53 | 50 | 53 | 1.9 | 22 | 2500 mF |
| 85 | 40 | 50 | 45.7 | 110 | 18 | 85 | 83 | 88 | 3.1 | 25 | 50 | 49 | 53 | 4.6 | 20 | |
| 115 | 68 | 43 | 52.7 | 138 | 23 | 83 | 70 | 55 | 19.7 | 25 | 35 | 29 | 18 | 28.0 | 10 | |

Using tap T5 it was possible at full load to reduce the current unbalance in motor M1 and M2 at full load to less than 1% (0.9% and 0.7% respectively) while using 2260 mF of capacitance. These unbalances are less than those often encountered on three-phase utility lines.

With the present invention the converter user can substantially balance the phase currents in the load over a wide range of possible loads by simply changing taps and adding or subtracting capacitance as required. The use of the autotransformer taps substantially compensates for the capacitive reactance added to the circuit by capacitor bank 17 and presents a much better phase current balance in the polyphase load than is readily achievable with conventional rotary converters. Although only six taps are shown on autotransformer 15, this is illustrative only. A greater number of taps could be provided to give the user even more flexibility in balancing the currents for a particular load condition.

A quick inspection of Table I–V reveals why the gage of the second winding section of the autotransformer is greater than that of the first winding section. $I_X$, the current which flows through the second winding section, is always substantially larger than $I_{C/XFMR}$, the current that flows through the first section. A review of the tables also reveals a substantial current unbalance in dynamoelectric machine 13, but the stator winding currents are all below the maximum rated current-carrying capacity of machine 13 and there is no danger of overheating any of the windings.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rotary phase converter for connection to a single-phase a.c. power source and adapted to supply polyphase current to a polyphase electrical load, said converter comprising:
   a dynamoelectric machine having at least three stator windings and at least first, second and third output terminals, said windings being oriented symmetrically with respect to each other both physically and electrically, each winding having a substantially equal number of active turns, said first and second terminals being adapted to be connected to the single-phase a.c. power source,
   an autotransformer connected across the second and third terminals, said autotransformer having at least one tap positioned intermediate the ends thereof to serve as an output of the converter, the first and second terminals also being outputs of the converter, and
   at least one capacitor connected between the first terminal and the autotransformer tap serving as a converter output, whereby the currents supplied from the converter outputs to the phases of the polyphase load are maintained substantially balanced at full load.

2. A rotary phase converter as set forth in claim 1 wherein the autotransformer has a plurality of taps, the relative magnitudes of the phase currents in said load being responsive to the particular tap being used as a converter output.

3. A rotary phase converter as set forth in claim 2 wherein the autotransformer winding includes a first winding section connected to the second terminal and a second winding section connected to the third terminal, said first and second winding sections being connected together intermediate said terminals, all the taps being in the second winding section.

4. A rotary phase converter as set forth in claim 3 wherein the first winding section comprises a predetermined number of turns of wire of a first predetermined cross sectional area and the second winding section comprises a predetermined number of turns of wire of a second predetermined cross sectional area, said second predetermined cross sectional area being greater than said first predetermined cross sectional area.

5. A rotary phase converter as set forth in claim 1 wherein the stator has first, second and third phase windings, said windings being wye-connected to each other and also being connected to the first, second and third terminals, respectively, said autotransformer being connected across two of the phase windings.

6. A rotary phase converter as set forth in claim 1 wherein the stator has three phase windings, said windings being delta-connected to each other, said autotransformer being connected directly across only one of said phase windings.

* * * * *